United States Patent [19]

Yeakey et al.

[11] Patent Number: 4,994,621
[45] Date of Patent: Feb. 19, 1991

[54] AMINATED, ALKOXYLATED HYDROXYL-TERMINATED POLYBUTADIENES

[75] Inventors: Ernest L. Yeakey; Robert L. Zimmerman; Michael Cuscurida, all of Austin, Tex.

[73] Assignee: Texaco Chemical Company, White Plains, N.Y.

[21] Appl. No.: 338,664

[22] Filed: Apr. 17, 1989

[51] Int. Cl.$^5$ ................. C07C 213/02; C07C 215/22
[52] U.S. Cl. ..................................... 564/475; 564/505
[58] Field of Search ................................ 564/475, 505

[56] References Cited

U.S. PATENT DOCUMENTS

| | | | |
|---|---|---|---|
| 3,236,895 | 2/1966 | Lee et al. | 260/584 |
| 3,654,370 | 4/1972 | Yeakey | 260/584 B |
| 4,124,758 | 11/1978 | Watts, Jr. et al. | 536/43 |
| 4,129,670 | 12/1978 | Riew | 427/386 |
| 4,139,698 | 2/1979 | Watts, Jr. | 536/50 |
| 4,181,682 | 1/1980 | Watts, Jr. et al. | 260/584 B |
| 4,521,581 | 6/1985 | Dominguez et al. | 528/57 |
| 4,618,717 | 10/1986 | Renken et al. | 564/475 |

OTHER PUBLICATIONS

A. V. Pocius, "Elastomer Modification of Structural Adhesives," *Rubber Chemistry and Technology*, vol. 58, No. 3, Jul.-Aug., 1985, pp. 622-635.

*Primary Examiner*—Richard L. Raymond
*Assistant Examiner*—Mark W. Russell
*Attorney, Agent, or Firm*—Jack H. Park; Kenneth R. Priem; David L. Mossman

[57] ABSTRACT

Aminated, alkoxylated hydroxyl-terminated polymers are made by a process involving first polymerizing one or more unsaturated hydrocarbons, such as butadiene, to form a liquid polymer. Next, the liquid polymer is provided with terminal hydroxyl groups. Then, the hydroxylated liquid polymer is alkoxylated with one or more alkylene oxides, such as ethylene oxide, propylene oxide, butylene oxide, and mixtures thereof, to provide secondary terminal hydroxyl groups. Finally, the alkoxylated liquid polymer is aminated over a transition metal oxide catalyst, such as a combination of nickel oxide/copper oxide/chromium oxide. If the alkoxylated, hydroxyl-terminated liquid polymer is terminated with primary hydroxyl groups, then the amination does not proceed well.

12 Claims, No Drawings

AMINATED, ALKOXYLATED HYDROXYL-TERMINATED POLYBUTADIENES

FIELD OF THE INVENTION

The invention relates to polyoxyalkylene polyamines, in one aspect, and more particularly relates to polyamines made by aminating an alkoxylated, hydroxy-terminated polyalkene.

BACKGROUND OF THE INVENTION

Polyoxyalkylene polyamines are well known. Typically, they may be used as curing agents for epoxy resins, as cross-linking agents or binders for textiles, and as intermediates in the preparation of polyureas, including flexible urethane foams and urethane elastomers.

A. V. Pocius in "Elastomer Modification of Structural Adhesives," Rubber Chemistry and Technology, Vol. 58, No. 3, July-August, 1985, pp. 622-635 presents a survey of some of the various elastomers used in providing structural adhesives with excellent shear strength and substantial resistance to cleavage. Some of these elastomers contain butadiene.

A number of patents are known to disclose polyoxyalkylene polyamines and methods for making them. For example, U.S. Pat. No. 3,236,895 teaches polyoxyalkylene-polyamines that are predominately diamines of the generic formula:

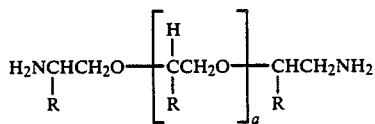

wherein each R represents an independently selected radical from the group consisting of hydrogen and lower alkyl radicals having from 1 to 6 carbon atoms and whereiin a represents an integer from 1 to 30. A method for making epoxy resins by admixing a polyglycidyl ether of a phenolic compound and a polyoxyalkylenepolyamine of U.S. Pat. No. 3,236,895, as a curing agent, is set out in U.S. Pat. No. 3,462,393. Also related to polyamines are U.S. Pat. Nos. 4,124,758, covering aminated cellulose derivatives prepared by the reductive amination of a hydroxyl cellulose; 4,139,698 covering aminated starch derivatives prepared by the reductive amination of an oxidized starch by reaction with ammonia or ammonium hydroxide; 4,181,682 covering polymeric amines of the formula:

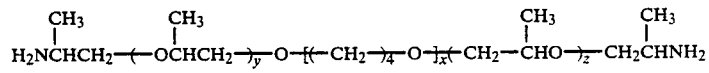

where x ranges from 6 to 50, y and z range from 1 to 20 with the sum of y and z being from 6 to 40; and 4,618,717 covering a process for the conversion of oxyethylene glycol monoalkyl ethers to the corresponding primary amines by reaction with ammonia in the presence of a nickel-copper-chromium-containing catalyst. U.S. Pat. No. 3,654,370 discloses that polyoxyalkylene polyamines may be prepared by treating the corresponding polyoxyalkylene polyols with ammonia and hydrogen over a catalyst prepared by the reduction of a mixture of the oxides of nickel, copper and chromium. The polyoxyalkylene polyols may be obtained by the addition of one or more alkylene oxides to an aliphatic polyhydric alcohol.

Room-temperature-curable compositions can be prepared readily by mixing (a) 100 parts by weight (pbw) of at least one non-cycloaliphatic epoxy resin and (b) from about 1 to about 1,000 pbw of at least one amine-terminated liquid polymer having a carbon-carbon backbone, (c) optionally, a chain extender or cross-linker and (d) a curing agent, according to U.S. Pat. No. 4,129,670. In this patent, the amine-terminated liquid polymers have the formula Y—(CO)—(B)—(CO)—Y, where Y is a univalent radical obtained by removing hydrogen from an amine group of an aliphatic, alicyclic, heterocyclic or aromatic amine containing at least two primary and/or secondary amine groups, and B is a polymeric backbone comprising carbon-carbon linkages. Polybutadiene is present in the long list of apparently suitable polymeric backbones recited therein. Another patent of interest is U.S. Pat. No. 4,521,581 which describes a process for the making of polymer polyols where a relatively low molecular weight liquid polymer of an ethylenically unsaturated monomer is mixed with a polyol and crosslinked in the polyol. The relatively low molecular weight polymer which is mixed in the polyol may have a variety of microstructures since the low molecular weight polymer is prepared separately from the polyol. Butadiene is recited in a long list of suitable unsaturated monomers.

It is always desirable to produce polyamines with improved properties, such as being able to impart greater water resistance to the resulting epoxy resin.

SUMMARY OF THE INVENTION

Accordingly, it is an object of the present invention to provide a new class of polyoxyalkylene polyamines.

It is another object of the present invention to provide new polyoxyalkylene polyamines having improved properties over those now known.

Another object of the invention is to provide polyoxyalkylene polyamines that may be more easily prepared than polymers using a similar backbone.

In carrying out these and other objects of the invention, there is provided, in one form, aminated, alkoxylated hydroxyl-terminated polymers made by a process involving first polymerizing one or more unsaturated hydrocarbons to form a liquid polymer. Next, the liquid polymer is provided with terminal hydroxyl groups. Then the hydroxylated liquid polymer is alkoxylated with one or more alkylene oxides to provide secondary terminal hydroxyl groups. Finally, the alkoxylated liquid polymer is aminated.

DETAILED DESCRIPTION OF THE INVENTION

It has been discovered that novel polyoxyalkylene polyamines may be made by aminating an alkoxylated, hydroxy terminated polybutadiene. The reaction sequence may be briefly summarized by noting that a hydroxy terminated polybutadiene of the formula set forth as follows:

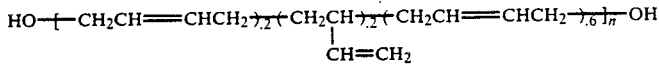

where n ranges from about 10 to about 60, is first alkoxylated and then aminated. It was surprisingly discovered that the reaction intermediate is, in one aspect, preferably capped with an alkylene oxide having at least three carbon atoms, such as propylene oxide, butylene oxide (all forms), etc., for example; otherwise, the amination does not proceed well. In other words, the hydroxy-terminated polybutadiene that is alkoxylated should, in one aspect, not be primary hydroxyl-terminated.

The resulting polyoxyalkylene polyamines have the following formula:

$$H_2N+CHCH_2O\!\!\!+_y(CH_2CH_2O)_z(CH_2CH=CHCH_2)_x(CH_2CH)_z(CH_2CH=CHCH_2)_{.6n}(OCH_2CH_2)_z(OCH_2CH)_yNH_2$$
$$R \qquad\qquad CH_2=CH \qquad\qquad R$$

where R is an alkyl group having from 1 to 4 carbon atoms; n ranges from about 10 to 60, in another aspect from about 10 to about 50; y ranges from about 2 to 26, and z ranges from about 0 to 26, in one aspect from 0 to about 10. These polyamines are very hydrophobic and are useful as curing agents for epoxy resins, and in reaction injection molding (RIM) elastomers. They may also be used in the preparation of flexible polyurethane foams having greater firmness. It is expected that part or all of the double bonds present in the original polyol would be reduced during amination.

The process for making the novel materials herein will be described in more detail. The monomer initiator for these polyoxyalkylene polyamines should be a homopolymer or co-polymer of an unsaturated hydrocarbon. The preferred monomer employed in the method and polyamines of the present invention is butadiene. Other suitable monomers include, but are not limited to, isoprene, 1,4-pentadiene, 1,6-hexadiene, 1,7-octadiene, styrene, acrylonitrile, methacrylonitrile, α-methylstyrene, methylstyrene, 2,4-dimethylstyrene, ethyl styrene, isopropylstyrene, butylstyrene, substituted styrenes, such as cyanostyrene, phenylstyrene, cyclohexylstyrene, benzylstyrene, nitrostyrene, N,N-dimethylaminostyrene, acetoxystyrene, methyl 4-vinylbenzoate, phenoxystyrene, p-vinyl diphenyl sulfide, p-vinylphenyl phenyl oxide, acrylic and substituted acrylic monomers such as acrylic acid, methacrylic acid, methyl acrylate, 2-hydroxyethyl acrylate, 2-hydroxyethyl methacrylate, methyl methacrylate, cyclohexyl methacrylate, benzyl methacrylate, isopropyl methacrylate, octyl methacrylate, ethyl α-ethyoxyacrylate, methyl α-acetoaminoacrylate, butyl acrylate, 2-ethylhexyl acrylate, phenyl acrylate, phenyl methacrylate, N,N-dimethylacrylamide, N,N-dibenzylacrylamide, N-butylacrylamide, methacrylyl formamide, vinyl esters, vinyl ethers, vinyl ketones, vinyl acetate, vinyl alcohol, vinyl butyrate, isopropenylacetate, vinyl formate, vinyl acrylate, vinyl methacrylate, vinyl methoxy acetate, vinyl benzoate, vinyl toluene, vinyl naphthalene, vinyl methyl ether, vinyl ethyl ether, vinyl propyl ethers, vinyl butyl ethers, vinyl 2-ethylhexyl ether, vinyl phenyl ether, vinyl 2-methoxyethyl ether, methoxybutadiene, vinyl 2-butoxyethyl ether, 3,4-dihydro-1,2-pyran, 2-butoxy-2'-vinyloxy diethyl ether, vinyl 2-ethylmercaptoethyl ether, vinyl methyl ketone, vinyl ethyl ketone, vinyl phenyl ketone, vinyl ethyl sulfide, vinyl ethyl sulfone, N-methyl-N-vinyl acetamide, N-vinylpyrrolidone, vinyl imidazole, divinyl sulfide, divinyl sulfoxide, divinyl sulfone, sodium vinyl imidazole, divinyl sulfide, divinyl sulfoxide, divinyl sulfone, sodium vinyl sulfonate, methyl vinyl sulfonate, N-vinyl pyrrole, dimethyl fumarate, dimethyl maleate, maleic acid, crotonic acid, fumaric acid, itaconic acid, monomethyl itaconate, t-butylaminoethyl methacrylate, dimethylaminoethyl methacrylate, glycidyl acrylate, allyl alcohol, glycol monoesters of itaconic acid, vinyl pyridine, maleic anhydride, maleimide, N-substituted maleimides, such as N-phenylmaleimide and the like.

The polymerization initiator catalyst may be any suitable initiator for the particular monomers employed. Suitable catalytic initiators useful in producing the polymer polyol compositions of this invention are the free radical type of vinyl polymerization catalysts, such as the peroxides, persulfates, perborates, percarbonates, azo compounds and the like. Specific examples include, but are not limited to, 2,2'-azo-bis-isobutyronitrile (AIBN), dibenzoyl peroxide, lauroyl peroxide, di-t-butyl peroxide, diisopropyl peroxide carbonate, t-butyl peroxy-2-ethylhexanoate, t-butylperneodecanoate, t-butylperbenzoate, t-butyl percrotonate, t-butyl perisobutyrate, di-t-butyl perphthalate, 2,2'-azo-bis(2-methylbutane-nitrile) for example. Other suitable catalysts may be employed, of course.

The polymerization of the monomer, such as butadiene, may be carried out according to conventional, known procedures. The polymers have hydroxyl groups placed on the terminal ends thereof also by any known technique.

The polyamine precursors may be hydroxyl-terminated liquid homopolymers of butadiene with two to twenty moles of an alkylene oxide, such as ethylene oxide, propylene oxide, butylene oxide, or mixtures thereof, added thereto. Alternatively, the intermediates could be hydroxyl-terminated liquid copolymers of butadiene and other vinyl monomers with similar alkylene oxide substitutents. As noted previously, it is highly preferred that the materials not be primary hydroxyl-terminated so that the amination may proceed most completely. That the terminating hydroxyl is secondary can be ensured by capping the precursor with an alkylene oxide other than ethylene oxide. With a secondary hydroxyl termination, the final degree of amination may range from 25 to 90%.

In one aspect, it is preferred that the amination be conducted over a catalyst, for example, a metal oxide where the metal is a transition metal, as from Groups 6 or 8–11 (new IUPAC notation) of the Periodic Table, also known as Groups VIA, VIIIA and IB (previous IUPAC notation) or Groups VIB, VIII and IB (CAS notation). More specific examples of suitable metal oxide catalysts include oxides of copper, chromium, nickel, cobalt and mixtures thereof. Ammonia or an ammonia or ammonium-containing compound may be employed as the co-reactant in the amination step. Typically, part or all of the double bonds are reduced in this amination procedure. The temperature range for the amination reaction may be from about 170 to about 250 C. and the pressure range may be from about 500 to about 5,000 psig. This amination technique is easier and simpler than prior techniques for making polybutadiene-based materials. The resulting polyoxyalkylene polyamines also provide more water-resistant, that is, hydrophobic, epoxy resins than previous polyamines.

The invention will be illustrated further with reference to the following examples.

EXAMPLE 1

Preparation of Polybutadiene Polyols

Into a one-half gallon stirred autoclave were charged 1000 g. of 2800 molecular weight (m.w.) liquid hydroxyl-terminated homopolymer of butadiene (Poly bd R45-HT, made by ARCO Chemical Co.). The reactor was then purged with nitrogen and heated to 80 C. Tetramethyl-ammonium hydroxide (15 g.) was then charged into the reactor and stirred until it was solubilized. Propylene oxide (96 g.) was then reacted at 80–85 C. over a one-half hour period. The reaction mixture was then digested three hours at 80–85 C., stripped at 110–115 C., and drained from the kettle. The finished product was a brown, viscous liquid which had the following properties:

| Properties | | |
|---|---|---|
| Hydroxyl no., | mg. KOH/g | 63.2 |
| Viscosity, | 77 F., cs | 6413 |
| | 100 F., cs | 3152 |

The $C^{13}$ NMR spectra of the product showed that the termination was all secondary hydroxyl.

EXAMPLE 2

Scale-up Preparation of Polybutadiene Polyols

This example will illustrate a scale-up preparation of the polybutadiene polyols which were reductively aminated in this invention.

Into a five-gallon kettle was charged 10 lb. of Poly bd R45-HT resin of Example 1. The reactor was then purged with prepurified nitrogen and heated to 80 C. Tetramethylammonium hydroxide (68 g.) was then charged into the reactor and stirred until it was solubilized. Propylene oxide (1.25 lb) was then reacted at 80–85 C., stripped at 110–115 C., and drained from the kettle. The finished product was a light brown, viscous liquid which had the following properties:

| Properties | | |
|---|---|---|
| Hydroxyl no., | mg. KOH/g. | 83 |
| Viscosity | 77 F., cs | 6463 |
| | 100 F., cs | 3074 |

The $C^{13}$ NMR spectra showed that only secondary hydroxyl groups were present in the product.

EXAMPLE 3

Amination of Polybutadiene Polyols

A one-liter autoclave was charged with 513 g. of the polyol from Example 2, 50 g. of ammonia and 80 g. of a nickel oxide-chromium oxide-copper oxide catalyst. The clave was pressurized to 400 psig with hydrogen. Then it was heated to 222 C. and held for one hour. The product was discharged from the reactor, cyclohexane added and it was then filtered to remove the catalyst. The cyclohexane was then removed at reduced pressure. The product had the following physical properties:

| Total acetylatables | 1.20 meq/g. |
|---|---|
| Total amine | 0.30 meq/g. |
| Primary amines | 0.28 meq/g. |

EXAMPLE 4

Amination of Polybutadiene Polyol

In this example, a 1250 ml. tubular reactor filled with the catalyst used in Example 3 was used. The temperature and feed rates follow:

| Temperature | 185 C. |
|---|---|
| Polyol (from Ex. 2) | 0.4 lb/hr. |
| Ammonia | 0.8 lb/hr. |
| Hydrogen | 38 l/hr. |

The crude reactor effluent was stripped at 100 C. and 10 mmHg vacuum for one hour. The product had the following properties:

| Total acetylatables | 1.03 meq/g. |
|---|---|
| Total amine | 0.65 meq/g. |
| Primary amines | 0.60 meq/g. |

EXAMPLE 5

Preparation of Flexible Polyurethane Foam

This example will illustrate the use of the polyamine of Example 4 in the preparation of flexible polyurethane foam. It will further show that firmer foams are produced using the products of this invention as compared to those made from prior art products, for example, Hycar 1300×16, an amine-terminated liquid polymer.

Formulations, details of preparation, and foam properties are shown in the following table. The foams were prepared according to conventional polyurethane foam preparation techniques.

| | A | B |
|---|---|---|
| Foam No. | | |
| Formulation, pbw | | |
| THANOL ® F-3016 | 90 | 90 |
| Polyamine of Ex. 4 | 10 | — |
| Hycar 1300x16 amine-terminated polymer | — | 10 |
| Water | 4.0 | 4.0 |
| L-711 silicon | 1.0 | 1.0 |
| TEXACAT ® TD-33 | 0.3 | 0.3 |
| T10-catalyst | 0.5 | 0.5 |
| Toluene diisocyanate | 49.7 | 49.8 |
| Isocyanate index | 1.05 | 1.05 |
| Details of preparation | | |
| Cream time, sec. | 10 | 10 |
| Rise time, sec. | 120 | 120 |
| Postcure, C. (hr.) | 100 (1) | 100 (1) |
| Properties | | |
| Density, pcf | 1.8 | 1.7 |
| Chatillon gauge, | 4.8 | 3.57 |

| | A | B |
|---|---|---|
| 25%, lb. | | |

EXAMPLE 6

Use of Polyamine in An Elastomer

This example will illustrate the use of the polyamine of Example 4 in the preparation of a urethane elastomer. The elastomer was made by mixing 48.54 g. of the polyamine of Example 4 and 7.25 g. Isonate 143L. The reaction mixture gelled quite rapidly forming a soft ductile elastomer.

| GLOSSARY | |
|---|---|
| Chatillon gauge | Manual Model LIC compression tester manufactured by John Chatillon and Sons, Inc. |
| Hycar 1300x16 | 870 amine equivalent weight amine terminated polymer, a product of B.F. Goodrich Co. |
| Isonate ® 143L | Liquid methylene di-p-phenylene isocyanate (MDI), a product of the Upjohn Co. |
| L-711 | Silicone surfactant, a product of Union Carbide Chemical Corp. |
| T10 | 50% stannous octoate in dioctyl phthalate, a product of M & T Chemicals. |
| TEXACAT ® TD-33 | 33% triethylenediamine in propylene glycol, a product of Texaco Chemical Co. |
| THANOL ® F-3016 | 3000 molecular weight propylene oxide/ethylene oxide adduct of glycerine, a product of ARCO Chemical Co. |

Many modifications may be made in the polyoxyalkylene polyamines of the present invention without departing from its true scope and spirit which are defined only by the appended claims herein. For example, one may find that a particular copolymer backbone or that a particular combination or proportion of certain aklylene oxides would provide polyoxyalkylene polyamines having certain advantages.

We claim:

1. Aminated, alkoxylated hydroxyl-terminated polymers made by a process comprising the steps of:
   polymerizing one or more unsaturated hydrocarbons to form a liquid polymer, where at least one of the unsaturated hydrocarbons is butadiene;
   providing the liquid polymer with terminal hydroxyl groups;
   alkoxylating the hydroxylated liquid polymer with one or more alkylene oxides to provide secondary terminal hydroxyl groups; and
   aminating the alkoxylated liquid polymer.

2. The aminated, alkoxylated hydroxyl-terminated polymers of claim 1 where the alkylene oxide of the third step is selected from the group consisting of ethylene oxide, propylene oxide, butylene oxide and mixtures thereof.

3. The aminated, alkoxylated hydroxyl-terminated polymers of claim 1 where after the alkoxylation of the third step, the product from that step is further alkoxylated with an alkylene oxide selected from the group consisting of propylene oxide, butylene oxide and mixtures thereof to provide the secondary terminal hydroxyl groups.

4. The aminated, alkoxylated hydroxyl-terminated polymers of claim 1 where the amination step is conducted over a catalyst having components selected from the group consisting of nickel oxide, copper oxide, chromium oxide, cobalt oxide and mixtures thereof.

5. Aminated, alkoxylated hydroxyl-terminated polybutadienes made by a process comprising the steps of:
   polymerizing butadiene to form a liquid polymer;
   providing the liquid polybutadiene with terminal hydroxyl groups;
   alkoxylating the hydroxylated liquid polybutadiene with one or more alkylene oxides selected from the group consisting of ethylene oxide, propylene oxide, butylene oxide, and mixtures thereof to form an intermediate;
   alkoxylating the intermediate from the previous step with an alkylene oxide selected from the group consisting of propylene oxide, butylene oxide and mixtures thereof to provide secondary terminal hydroxyl groups; and
   aminating the alkoxylated liquid polymer.

6. A process for making aminated, alkoxylated hydroxyl-terminated polymers made by a process comprising the steps of:
   polymerizing one or more unsaturated hydrocarbons to form a liquid polymer, where at least one of the unsaturated hydrocarbons is butadiene;
   providing the liquid polymer with terminal hydroxyl groups;
   alkoxylating the hydroxylated liquid polymer with one or more alkylene oxides to provide secondary terminal hydroxyl groups; and
   aminating the alkoxylated liquid polymer.

7. The process of claim 6 where the alkylene oxide of the third step is selected from the group consisting or ethylene oxide, propylene oxide, butylene oxide and mixtures thereof.

8. The process of claim 6 where after the alkoxylation of the third step, the product from that step is further alkoxylated with an alkylene oxide selected from the group consisting of propylene oxide, butylene oxide and mixtures thereof to provide the secondary terminal hydroxyl groups.

9. The process of claim 6 where the amination step is conducted over a catalyst having components selected from the group consisting of nickel oxide, copper oxide, chromium oxide, cobalt oxide and mixtures thereof.

10. Aminated, alkoxylated hydroxyl-terminated polybutadienes having the formula:

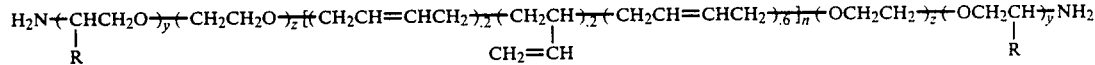

where R is an alkyl group having from 1 to 4 carbon atoms, n ranges from about 10 to 60, y ranges from about 2 to 26, and z ranges from about 0 to 26.

11. The aminated, alkoxylated hydroxyl-terminated polybutadienes of claim 10 wherein n ranges from about 10 to 50, and z ranges from about 0 to 10.

12. The aminated, alkoxylated hydroxyl-terminated polybutadienes of claim 10 wherein part or all of the double bonds present are reduced.

* * * * *